US007466719B2

(12) United States Patent
Xu et al.

(10) Patent No.: US 7,466,719 B2
(45) Date of Patent: Dec. 16, 2008

(54) PACKET ROUTING IN A MULTI-BEARER-TYPE NETWORK

(75) Inventors: Lin Xu, Lempäälä (FI); Toni Paila, Degerby (FI)

(73) Assignee: Nokia Corporation, Espoo (FI)

(*) Notice: Subject to any disclaimer, the term of this patent is extended or adjusted under 35 U.S.C. 154(b) by 1136 days.

(21) Appl. No.: 10/185,716

(22) Filed: Jul. 1, 2002

(65) Prior Publication Data

US 2003/0026211 A1 Feb. 6, 2003

Related U.S. Application Data

(63) Continuation-in-part of application No. PCT/FI00/01166, filed on Dec. 29, 2000.

(30) Foreign Application Priority Data

Dec. 31, 1999 (FI) ................................ 19992850

(51) Int. Cl.
*H04L 12/28* (2006.01)
*H04L 12/66* (2006.01)
*H04Q 7/00* (2006.01)
*H04Q 7/20* (2006.01)
*H04J 3/16* (2006.01)

(52) U.S. Cl. .................... 370/465; 370/468; 370/395.2; 370/352; 370/419; 455/453; 455/452.2

(58) Field of Classification Search ................. 370/328, 370/329, 330, 419, 468, 389, 392, 396, 400, 370/401, 352, 395.2, 395.4, 395.21, 395.5, 370/465; 455/403, 452.2

See application file for complete search history.

(56) References Cited

U.S. PATENT DOCUMENTS 5,910,951 A 6/1999 Pearce et al.
6,275,693 B1 * 8/2001 Lin et al. ................. 455/414.3
6,374,112 B1 * 4/2002 Widegren et al. ........ 455/452.2
6,608,832 B2 * 8/2003 Forslow ...................... 370/353
6,693,892 B1 * 2/2004 Rinne et al. ................. 370/348
6,747,986 B1 * 6/2004 Charas et al. ............... 370/465

(Continued)

FOREIGN PATENT DOCUMENTS

WO WO 97/36405 10/1997

(Continued)

OTHER PUBLICATIONS

T. Lauterbach and M. Unbehaun, "Multimedia Environment for Mobiles (MEMO)- Interactive Multimedia Services to Portable and Mobile Terminals," in ACTS Mobile Communication Summit, 1997.

*Primary Examiner*—Hanh Nguyen
(74) *Attorney, Agent, or Firm*—Pillsbury Winthrop Shaw Pittman LLP

(57) ABSTRACT

A method for sending a data packet, which directly or indirectly indicates a quality-of-service requirement, to a mobile node from a correspondent node via a multi-bearer network, or MBN, that provides at least one interface unit to each of multiple alternative bearer networks between the MBN and the mobile node includes, in one embodiment, selecting an optimal bearer network for sending a data packet between the MBN and the mobile node based on the quality-of-service requirement of the data packet in question; traffic load data related to the multiple bearers; interface unit availability information; and bearer type preference information.

32 Claims, 4 Drawing Sheets

U.S. PATENT DOCUMENTS 7,010,603 B2 * 3/2006 Martin et al. ............... 709/227
7,013,335 B2 * 3/2006 Barnhouse et al. .......... 709/223

FOREIGN PATENT DOCUMENTS

WO WO 98/29975 7/1998
WO WO 98/57482 12/1998
WO WO 99/39480 8/1999
WO WO 99/48310 9/1999
WO WO 99/52305 10/1999
WO WO 99/66736 12/1999
WO WO 00/10306 2/2000
WO WO 00/10357 2/2000

* cited by examiner

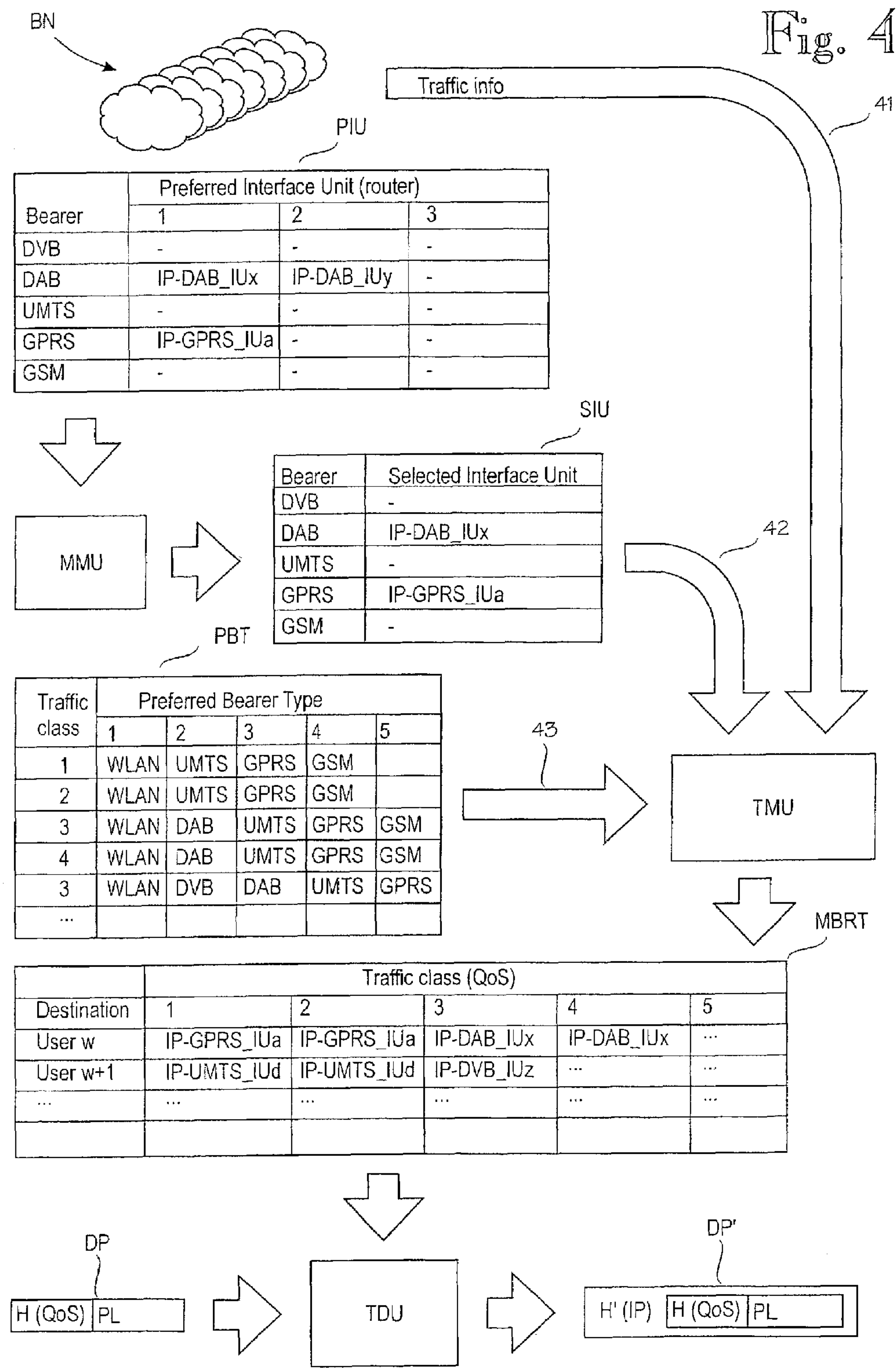
Fig. 4
BN
Traffic info
41
PIU
Preferred Interface Unit (router)
Bearer
1
2
3
DVB - - -
DAB IP-DAB_IUx IP-DAB_IUy -
UMTS - - -
GPRS IP-GPRS_IUa - -
GSM - - -
SIU
MMU
Bearer Selected Interface Unit
DVB -
DAB IP-DAB_IUx
UMTS -
GPRS IP-GPRS_IUa
GSM -
42
PBT
Traffic class
Preferred Bearer Type
1 2 3 4 5
1 WLAN UMTS GPRS GSM
2 WLAN UMTS GPRS GSM
3 WLAN DAB UMTS GPRS GSM
4 WLAN DAB UMTS GPRS GSM
3 WLAN DVB DAB UMTS GPRS
...
43
TMU
MBRT
Traffic class (QoS)
Destination 1 2 3 4 5
User w IP-GPRS_IUa IP-GPRS_IUa IP-DAB_IUx IP-DAB_IUx ...
User w+1 IP-UMTS_IUd IP-UMTS_IUd IP-DVB_IUz ... ...
... ... ... ... ... ...
DP
H (QoS) PL
TDU
DP'
H' (IP) H (QoS) PL

MBRT

| | Traffic class (QoS) | | | | | | | | | |
|---|---|---|---|---|---|---|---|---|---|---|
| Destination | 1 | | 2 | | 3 | | 4 | | 5 | |
| User w | IP-GPRS_IUa | | IP-GPRS_IUa | | IP-DAB_IUx | | ··· | | ··· | |
| | B=0 | T=14 | B=0 | T=2 | B=1 | T=3 | | | | |
| User w+1 | IP-UMTS_IUd | | IP-UMTS_IUd | | IP-DVB_IUz | | ··· | | ··· | |
| | B=0 | T=4 | B=1 | T=3 | B=0 | T=3 | | | | |

PACKET ROUTING IN A MULTI-BEARER-TYPE NETWORK

This is a Continuation-In-Part of International Application PCT/FI00/01166, which was filed on Dec. 29, 2000, and whose contents are incorporated by reference in its entirety.

TECHNICAL FIELD OF INVENTION

The invention relates to traffic management in a multi-bearer packet data network.

BACKGROUND OF THE INVENTION

A multi-bearer network, or an MBN, is a network having the capability to carry a data packet via one of several alternative bearers. To be more precise, the term 'multi-bearer network' should be interpreted as meaning 'multi-bearer-type network', or in other words, a network arrangement which provides multiple different bearer types for data packet delivery. An example of a suitable MBN is a concept known as MEMO (Multimedia Environment for Mobiles), see reference 1. Additionally, the MBN supports mobility of a subscriber terminal. An example of terminal mobility is IP mobility, which is the topic of standard RFC2002 by the Internet Engineering Task Force (IETF). This RFC standard is incorporated herein by reference.

The problem underlying the invention is how to select the optimal bearer for each data packet in varying situations in a multi-bearer network. Data packets have different quality-of-service requirements. Situations may vary because the subscriber moves or the network load changes.

BRIEF SUMMARY OF THE INVENTION

Accordingly, it is an object of the present invention to provide a mechanism for selecting the optimal bearer for each data packet in varying situations. The object is achieved by a method and equipment which are characterized by what is disclosed in the attached independent claims. Preferred embodiments of the invention are disclosed in the attached dependent claims. The invention is based on the idea that selecting the optimal bearer for a data packet between the MBN and the mobile node is based on a combination of 1) the quality-of-service requirement (traffic class) of the data packet in question, 2) the mobility data related to the mobile node, 3) the traffic data related to the multiple bearers, and 4) bearer availability information. The bearer preference information can be obtained from the mobile node, and optionally, from the operators of the home and visited MBN operators.

In order to save the battery of a portable mobile node, it is preferable that the mobile node only monitors one bearer type (network) at a time. For example, the subscriber data related to the mobile node can include a default bearer type, such as GSM or UMTS. The mobile node should be paged on this bearer. The mobile node can be ordered to monitor the selected bearer type by sending a modified page message which indicates the selected bearer type, channel, possible decryption data, etc. Alternatively, such information can be sent in a separate message, such as a short message, USSD, (Unstructured Supplementary Service Data), data call or the like.

According to another preferred embodiment of the invention, as long as the mobile node is within a certain coverage area, all IP packets belonging to the same session (or flow if flow labels are used) are routed via the same interface unit. For example, if a mobile node is receiving IP packets from a DAB network, via a cell x, all IP packets of the same session should be routed via DAB cell x, unless the mobile node moves out of the coverage area of this cell.

BRIEF DESCRIPTION OF THE SEVERAL VIEWS OF THE DRAWING

The method and the apparatus according to the invention will be described in more detail by means of preferred embodiments with reference to the appended drawing in which:

FIG. 4 illustrates the cooperation between a traffic management unit TMU and a traffic distribution unit.

DETAILED DESCRIPTION OF THE INVENTION

Figure 1A:
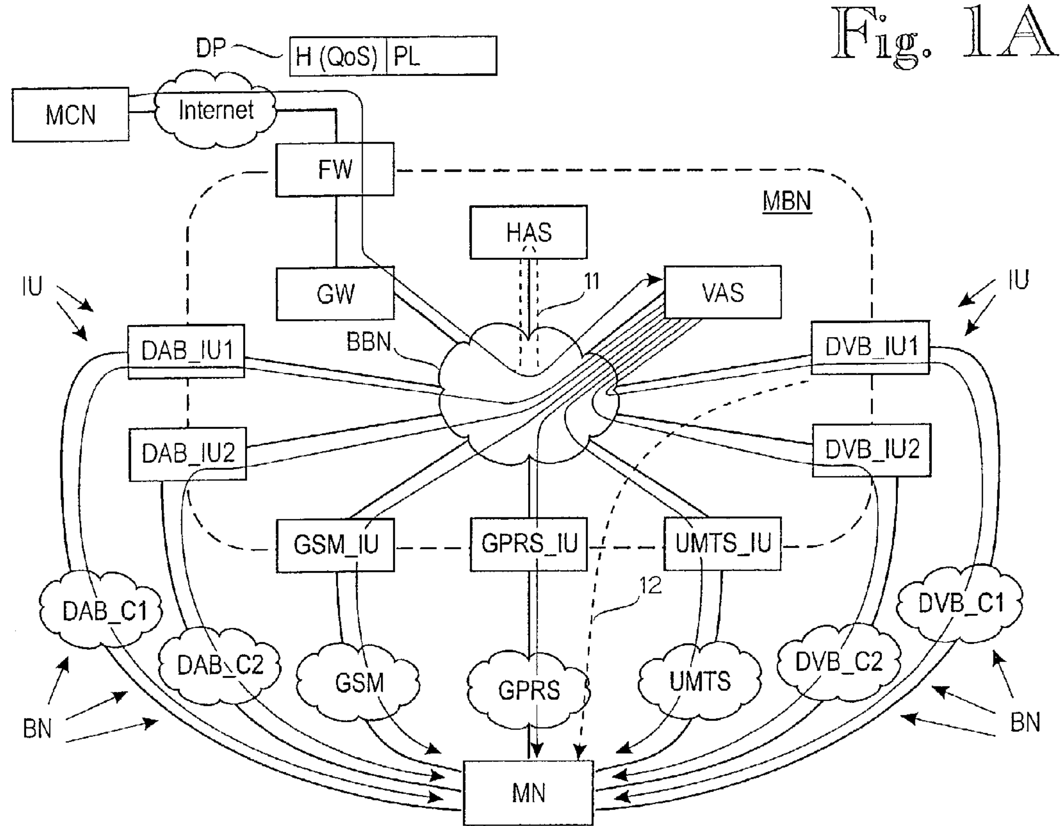
FIG. 1A shows a preferred structure of a network arrangement in which an embodiment of the invention can be used and the available options for mobile node-terminated (downlink) traffic.

FIG. 1A shows a preferred structure of a network arrangement in which an embodiment of the invention can be used. A mobile node MN communicates with its correspondent node MCN via a multi-bearer network MBN which offers several alternative bearers for a data packet DP. Each data packet comprises a header H and a payload part PL. To be precise, a data packet typically has several headers inside each other, because each protocol layer inserts its own header. However, each protocol layer only handles each own header, and a model with only one network layer header is usually sufficient for describing the invention. The header indicates, directly or indirectly, a quality-of-service requirement QoS for the data packet. An example of a direct QoS indication is a case where the data packet header includes a parameter which is or which can be directly mapped to a quality-of-service requirement parameter. An example of an indirect QoS indication is a case where the header indicates a PDP (packet data protocol) context, and the PDP context in turn indicates the QoS requirement. It should be understood, that 'quality of service' is a very generic term indicating certain requested or negotiated transmission characteristics, such as bit rate, maximum delay and/or packet loss probability. Depending on the actual protocol used, quality of service is indicated by or mapped to one of the existing appropriate fields, such as the Preference field of IPv6 or the Type of Service of IPv4. The term 'traffic class' is used to refer collectively to the fields which are used to indicate the quality-of-service requirement.

In FIG. 1A, it has been assumed that the MBN communicates with the MCN via the Internet. There is preferably a firewall FW at the edge of the MBN. A gateway node GW interfaces the MBN to the Internet. A backbone network BBN combines the different bearer networks BN. It may be the MBN operator's internal network. A physical example of a BBN is a high-speed local-area network or a wide-area network. A home administration system HAS is largely equivalent to a home agent in the IP mobility scheme (described in the RFC 2002). A visitor administration system VAS is a logical extension of a foreign agent in the IP mobility scheme. The MBN has access to several bearers for conveying the data packet to the mobile node MN.

The bearers include a first set of bidirectional bearers. Examples of bidirectional bearers are circuit-switched mobile networks, such as GSM (Global System for Mobile communications), and packet-switched mobile networks, such as GPRS (General Packet Radio Service), and third generation mobile networks, such as UMTS (Universal Mobile Telecommunications System), which offer both circuit-switched and packet-switched bearers. For each bidirectional bearer, there is a corresponding interface unit GSM_IU, GPRS_IU and UMTS_IU.

The bearers include a second set of unidirectional bearers. Examples of unidirectional bearers are digital audio broadcast (DAB) and digital video broadcast (DVB). For both DAB and DVB, FIG. 1 shows two cells DAB_C1, DAB_C2; DVB_C1, DVB_C2, and their corresponding interface units DAB_IU1, DAB_IU2; DVB_IU1, DVB_IU2.

In the system of FIG. 1, there is another difference between the first and second set of bearers. In addition to being bidirectional, the bearers of the first set are point-to-point bearers. In other words, each connection is customized to one particular recipient. In contrast, the bearers of the second set are broadcast or multicast bearers. In other words, it is not immediately apparent how a connection can be customized to individual recipients. One solution to this problem is encryption of the broadcast/multicast bearers with distribution of decryption keys only to the intended recipients.

Within the context of this application, 'uplink' means from the mobile node MN to the correspondent node MCN and 'downlink' means the inverse direction. The bold arrows in FIG. 1 depict various routing options for data packets in the downlink direction. For the span 12 between the MCN and the VAS, data packets are routed directly if the IP address of the mobile node MN (or its subscriber) does not belong to the MBN network. If the IP address belongs to the MBN network, data packets are routed via the home administration system HAS. This route is drawn with a thin dotted line 11. For the span 12 between the VAS and the MN, the VAS has several alternative bearers. According to an embodiment of the invention, the VAS considers all of the following: 1) the quality-of-service requirement (the traffic class) of the data packet in question, 2) the mobility data related to the mobile node (i.e., which bearers and which interface units can be used to reach the MN), 3) the traffic load/resource availability data related to the multiple bearers, and 4) bearer preference information. The optimal bearer selection and the internal structure of the VAS will be described later in more detail.

Figure 1B:
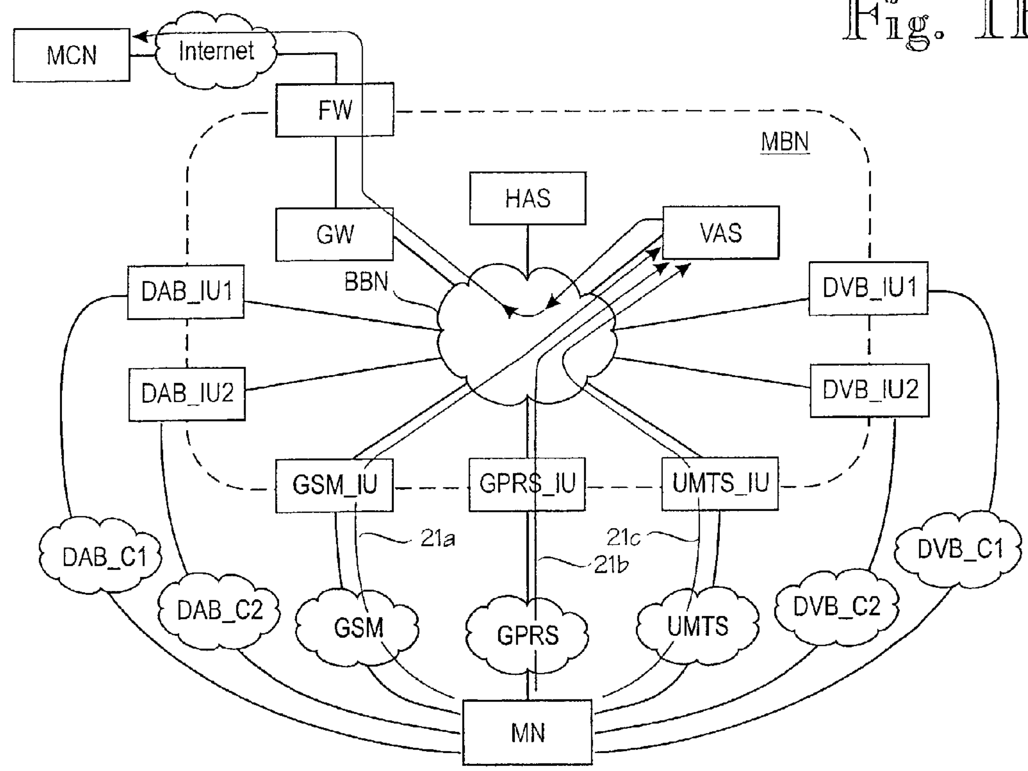
FIG. 1B shows the available options for mobile node-originated (uplink) traffic.

FIG. 1B shows the available bearer options for uplink traffic between the MN and the MCN. Because the DAB and DVB bearers are unidirectional (downlink only), they are not available for uplink traffic, and the only available bearers 21*a* to 21*c* are via the mobile networks GSM, GPRS and UMTS.

Figure 2:
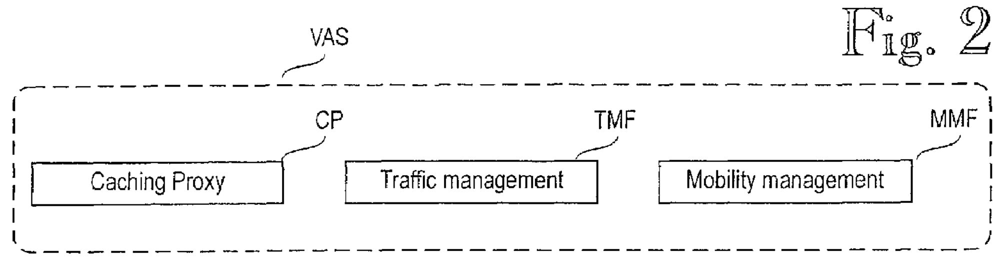
FIG. 2 shows the major functional blocks of a visitor administration system according to an embodiment of the invention.

FIG. 2 shows the major functional blocks of a visitor administration system VAS according to an embodiment of the invention. The VAS has three main functions or sections: 1) a mobility management function MMF, 2) a traffic management function TMF, and 3) a caching proxy CP. The mobility management function MMF of the VAS is largely equivalent to a foreign agent in the IP mobility scheme of RFC 2002. The MMF may also participate in authentication and/or charging. The functions of the traffic management function TMF include a) collecting traffic information from the various bearer networks (GSM, GPRS, UMTS, DAB, DVB . . . ), b) collecting traffic management-related information from the mobile node MN and its home MBN, c) sending traffic management-related messages to the mobile node MN, d) selecting the bearer network for downlink traffic, and e) forwarding downlink traffic to the selected bearer network. The function of the caching proxy CP is to maintain frequently-requested content in high-speed memory in order to minimize retrieval of such content over telecommunication lines. The caching proxy CP should have enough intelligence to handle data packets in an application-specific manner, instead of merely caching IP traffic packets.

Figure 3A:
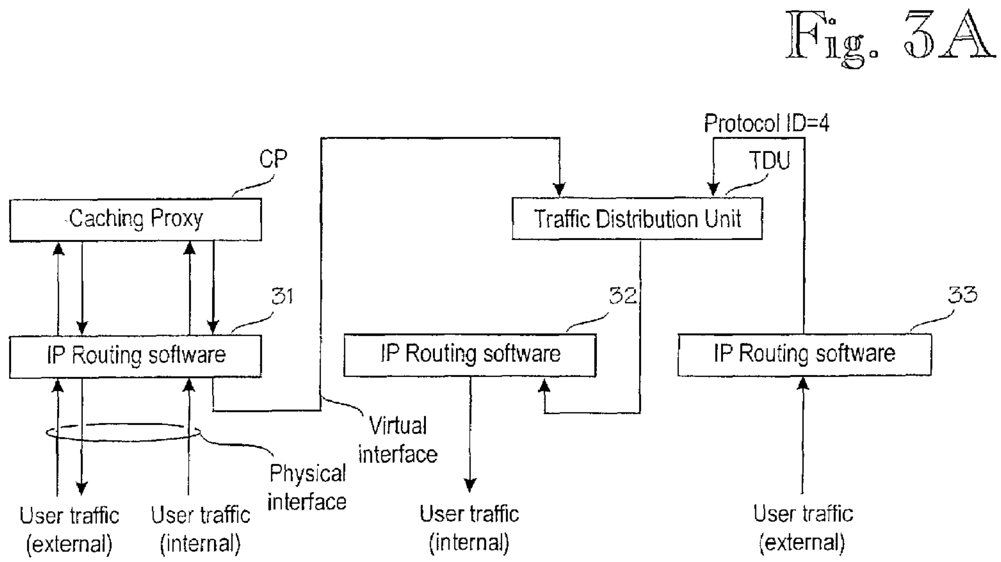
FIGS. 3A and 3B show the internal structure of the visitor administration system VAS in more detail.
Figure 3B:
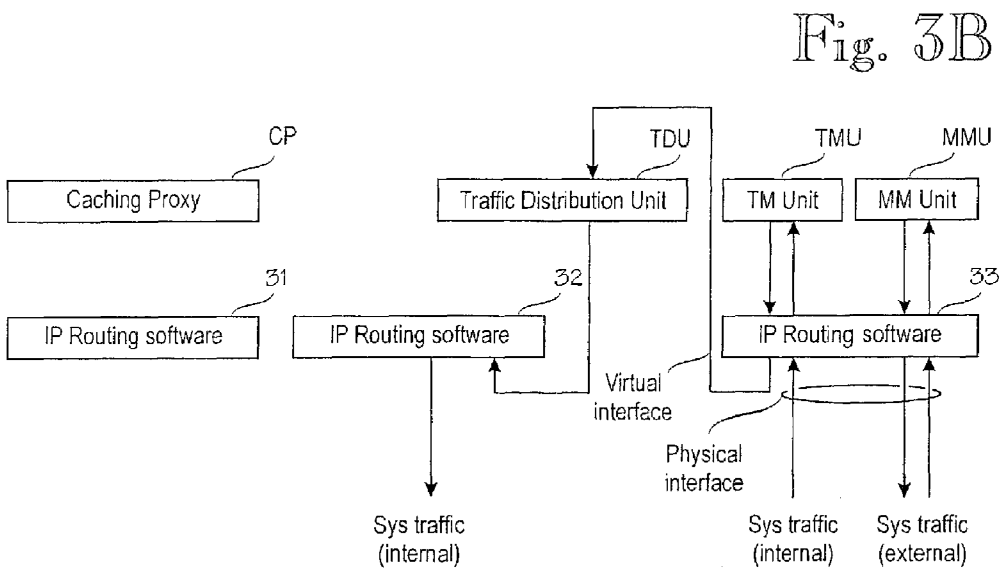

FIGS. 3A and 3B show the internal structure of the visitor administration system VAS in more detail from the point of view of traffic management. FIG. 3A shows the VAS structure from the point of view of user traffic.

IP Routing Software blocks 31 to 33 route data packets to the appropriate recipients, based on the packet headers. These blocks also decapsulate IP packets towards the VAS and pass the decapsulated packets to the upper layers for further processing. Correspondingly, the blocks 31 to 33 also encapsulate packets arriving from the upper layers. In FIGS. 3A and 3B, the packets from the upper layers are indicated as the traffic flow entering the blocks 31 to 33 from above. The VAS also comprises a traffic distribution unit TDU. The function of the TDU is a) to determine the traffic class of incoming IP packets based on one or more quality-of-service related parameters indicated by the packet header (these parameters may comprise 'type of service' for IPv4 and 'preference' or 'flow label' for IPv6), b) based on the traffic class/QoS requirement, to select an appropriate bearer (radio network) for downlink traffic, and c) to encapsulate each IP packet into an outer IP header towards the selected bearer network and interface unit. The fact that the arrow from the TDU enters IP routing block 32 from below indicates that the TDU has already encapsulated the IP packets, and the block 32 should not perform another encapsulation.

FIG. 3B shows the VAS structure from the point of view of system traffic, mobility management and traffic management. A mobility management unit MMU performs the functions which are normally performed by a foreign agent in an IP network with mobile IP support, with some enhanced functionality related to MBN support, such as cell selection and handover control within a broadcast network or between networks. The function of the traffic management unit TMU is a) to collect traffic load information from the various bearer networks BN (DVB, DAB, UMTS, etc.), b) to collect and to update (via the MMU) bearer preference information from the mobile nodes, c) optionally to collect bearer type preference information from the home network of each mobile node, d) to create and update bearer routing information to the TDU, and e) to send traffic administrative messages to the mobile nodes. For performing these functions, the traffic management unit TMU receives the following input: a) traffic load information from the various bearer networks BN, b) bearer preference information from the mobile nodes, and c) optionally bearer type preference information from the home MBN of each mobile node. The traffic distribution unit TDU and the traffic management unit TMU cooperate to perform the traffic management function TMF shown in FIG. 2. The cooperation of the TDU and the TMU will be described in more detail in connection with FIG. 4.

FIG. 4 illustrates the cooperation between the traffic management unit TMU and the traffic distribution unit TDU. The traffic management unit TMU considers three kinds of information: 1) traffic load information 41 from the various bearer networks BN, 2) available interface unit information 42 and 3) preferred bearer type 43. The traffic information 41 from the various bearer networks BN indicates the load (or inversely: the available capacity) on the alternative bearer networks. This information may be used as a basis for hard decisions (whether or not a requested bearer can be allocated) or for soft decisions (whether or not tariffs should be adjusted to promote the use of lightly loaded bearer networks). The available interface unit information 42 can be generated as follows. A preferred interface unit table PIU indicates for each bearer type (DVB, DAB, UMTS, GPRS and GSM) one or more preferred interface units (or to be more precise the IP addresses of the preferred interface units) and their rank of preference. The PIU table is mobile-node-specific. Each mobile node MN should directly or indirectly indicate its PIU table during registration and in connection with location updates. For example, an MN may indicate the PIU directly by forming and sending the PIU table to the VAS. The PIU table is not sent to the TMU directly, however. Instead, the mobility management unit MMU controls handover within and between the networks. Accordingly, the MMU also selects the interface unit for each broadcast network. The MMU considers the PIU and the mobility data related to the mobile node (i.e., what interface unit can be used to reach the MN). The MMU uses this information to create an available interface unit table AIU which is then applied to the TMU (instead of the PIU table as such). The preferred bearer type information 43 can be organized as a table of a preferred bearer type PBT. The PBT table indicates, for each traffic class, several alternative bearer types with decreasing preference. The acronym 'WLAN' stands for wireless local-area network, although such a network is not shown separately in FIGS. 1A and 1B. For example, for traffic class 1, the most preferred bearer types are WLAN and UMTS, but GPRS and GSM are also possible choices. The VAS may obtain a home-MBN-specific PBT table in connection with MN registration, or it may use a generic default PBT table.

The traffic management unit TMU considers all the available information 41 through 43, and creates and updates a Multi-Bearer Routing Table MBRT in the traffic distribution unit TDU. The MBRT indicates the IP address of the appropriate interface unit for each combination of active user w, w+1, etc. and traffic class 1 through 5 (the number 5 being just one example). It should be noted that a user with multiple simultaneous sessions can have an entry for each session in the MBRT table. When the traffic distribution unit TDU receives a data packet whose header H indirectly indicates a traffic class (via a QoS-related parameter), the TDU uses the corresponding user ID and the traffic class to retrieve the IP address of the appropriate interface from the Multi-Bearer Routing Table MBRT. Next, the TDU encapsulates the data packet DP into another data packet DP' whose header H' indicates the IP address (of the selected interface unit) which was retrieved from the MBRT. When the selected interface unit receives the data packet DP', it decapsulates the outer header H' and sends the original data packet DP to the mobile node MN. An advantage of an MBRT table substantially as shown in FIG. 4 is that it directly indicates, for each data packet, the IP address to which the packet is to be sent. In other words, sending an individual data packet involves no decision-making, just a retrieval of an IP address from the MBRT table.

For IPv6, the traffic class can be mapped to Preference. For IPv4, the traffic class can be mapped to Type of Service. If the Differentiated Services protocol is used, traffic class can be mapped to bits reserved for future use. According to a preferred embodiment of the invention, for IPv6, all packets with identical flow labels are usually mapped identically.

Let us assume that a user w has three simultaneous applications: news, FTP and video on demand. The IP packets from the MCN to this user may have a preference/priority value of 1 for news, 4 for FTP and 9 for video. The PIU and PBT tables are as shown in FIG. 4 and the MBN uses five traffic classes, and the mapping between the preference value and the traffic class is as follows:

| preference value | traffic class |
|---|---|
| 1-2 | 1 |
| 3 | 2 |
| 4-7 | 3 |
| 8-11 | 4 |
| 12-15 | 5 |

In such a case, the IP packets carrying news belong to traffic class 1, and they are routed via the router whose IP address is IP-GPRS_IUa. The IP packets carrying FTP belong to traffic class 3, and they are routed via the router whose IP address is IP-DAB_IUx. The IP packets carrying video belong to traffic class 4, and they are routed via the router whose IP address is IP-DAB_IUx.

Let us now assume that the user w starts yet another application, such as e-mail having a preference value of 2. In this case, IP packets carrying e-mail belong to traffic class 1, and they are routed via the router whose IP address is IP-GPRS_IUa.

Figures 5, 6:
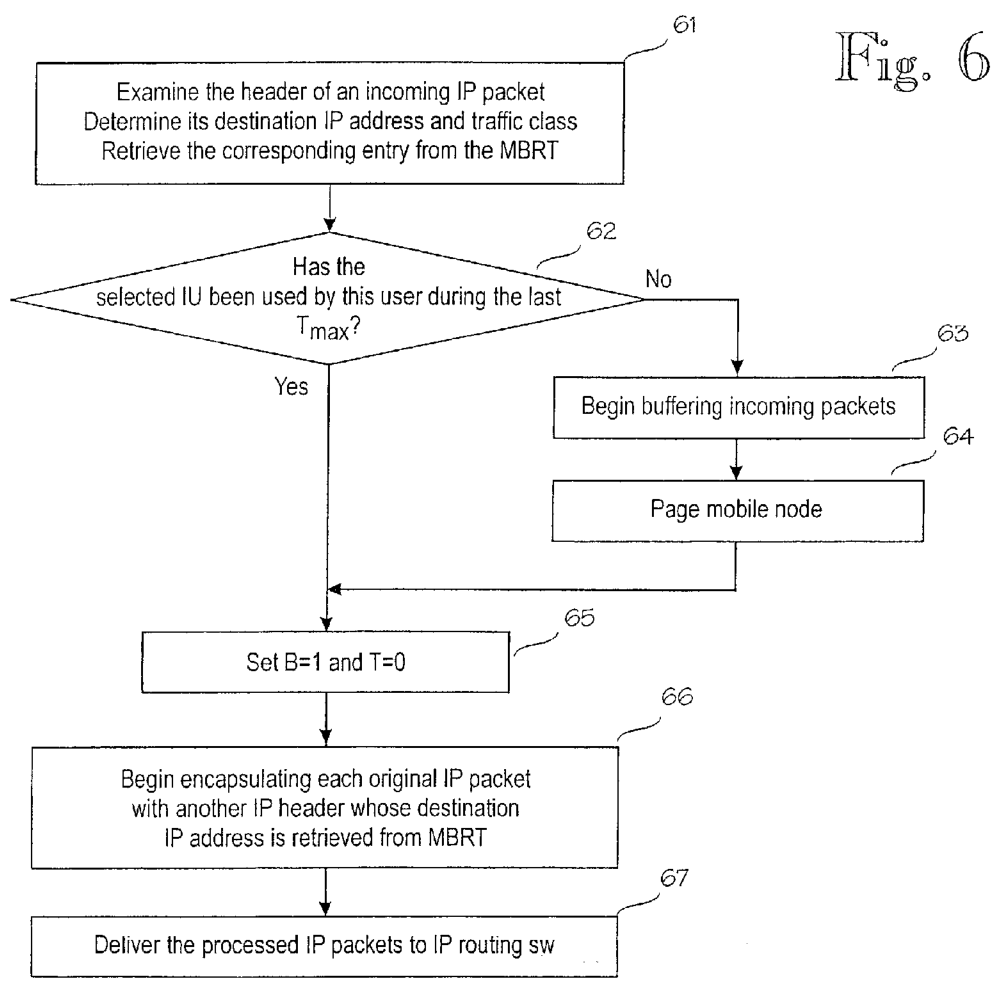
FIG. 5 shows a preferred feature of an embodiment of the invention which relates to broadcast networks.
FIG. 6 shows a preferred version of a routing table with two optional fields.

FIG. 5 shows yet another preferred feature or addition to the embodiment shown in FIG. 4. This preferred feature allows paging the mobile node via a single default bearer and using a single interface unit as long as the mobile node is within its coverage area. The feature is based on the idea that IP packets separated by a time interval exceeding a certain maximum time $T_{max}$ are treated by the MBN as belonging to two separate sessions. In this case, each entry in the MBRT table includes not only the IP address of the relevant interface unit but also a busy flag B and a timer field T. The timer field T is compared with the maximum value $T_{max}$, the value of which is optimized by the operator. If the busy flag B is zero, it means that no IP packets used this entry for the past time interval of $T_{max}$. If the busy flag B is set (indicated in FIG. 6 with 'B=1'), it means that at least one IP packet used this entry for the past time interval of $T_{max}$. The value of each timer field T is incremented by the TMU in a constant time interval. Each time an IP packet is routed by using a certain entry in the MBRT table, the corresponding timer field T of that entry is reset to zero and the busy flag is set to one. Setting the busy flag to '1' is preferably performed or triggered by the TDU when it routes an IP packet.

FIG. 6 shows a way to use the B and T fields shown in FIG. 5. In step 61, the traffic distribution unit TDU examines the header of an incoming IP packet. The TDU determines the destination IP address and traffic class (direct or indirect mapping) and retrieves the corresponding entry from the MBRT table. In step 62, the TDU checks the busy flag B to see if the selected interface unit IU has been used by this user/session during the last time interval $T_{max}$. If not, then in step 63 the TDU begins to buffer incoming IP packets and in step 64 the TDU pages the mobile node. More preferably, to reduce the computational load of the TDU, the TDU can only trigger a page while the actual page operation is performed by another unit, such as the TMU. In step 65, when the page operation is complete and the mobile node responds, the busy flag T is set to one and the timer field T is initialized to zero. In step 66, the TDU begins encapsulating each original IP packet with another IP header whose destination IP address is retrieved from the MBRT table. Finally, in step 67, the encapsulated IP packets are delivered via the IP routing software to the mobile node.

The traffic management unit TMU is responsible for updating the MBRT. The MBRT updating should obey the following principles. An entry of the MBRT table, or more specifically, the IP address for a certain combination of a user/session and a traffic class, can only be modified under the following circumstances: If the busy flag B is zero, the IP address can be updated if a) the modification is caused by a handover between cells of a broadcast network or between different networks, b) the mobile node moves out of the coverage area of one bearer, or c) the traffic load/resource availability changes. On the other hand, if the busy flag B is zero, the IP address can be updated if a) the modification is caused by a handover between cells of a broadcast network, b) the mobile node moves out of the coverage area of one bearer, or c) there is an extraordinary change of traffic condition. Interruption of IP traffic flow should be avoided, if possible. This is particularly important with IP packets having high QoS requirements. Inversely, flows with low QoS requirements should be interrupted first, if interruptions cannot be avoided. Obeying these principles allows the use of the same interface unit as long as possible.

The invention claimed is:

1. A method for sending a data packet, which directly or indirectly indicates a quality-of-service requirement, to a mobile node from the mobile node's correspondent node via a multi-bearer network (MBN), the method comprising:

providing, via the MBN, at least one interface unit for each of multiple alternative bearer networks between the MBN and the mobile node and a mobility management function to maintain mobility data related to the mobile node; and selecting an optimal bearer network for sending a data packet between the multi-bearer network and the mobile node based upon a combination of each of:

a quality-of-service requirement of the data packet;

traffic load data related to the multiple bearers;

dynamically maintained interface unit availability information; and bearer type preference information.

2. A method according to claim 1, further comprising combining said traffic load data, said interface unit availability information and said bearer type preference information into a data structure which functionally corresponds to a two-dimensional table, each entry of which directly indicates a preferred interface unit for a combination of a subscriber and a quality-of-service requirement.

3. A method according to claim 2, wherein each entry of said data structure also indicates whether the entry in question has been used during a predetermined time interval.

4. A method according to claim 1, wherein the bearer type preference information indicates, at least for some values of the quality-of-service requirement, multiple preferred bearers and respective ranks of preference.

5. A method according to claim 1, further comprising selecting the optimal bearer network the based on interface unit preference information that indicates, at least for some bearer types, multiple preferred interface units and respective ranks of preference.

6. A method according to claim 5, wherein the bearer type preference information is configurable by the operator of the multi-bearer network.

7. A method according to claim 5, wherein the interface unit preference information is sent by the mobile node to the multi-bearer network.

8. A method according to claim 1, wherein said bearer networks provide at least a first set of point-to-point bearers and a second set of multicast or broadcast bearers, and the step of sending a data packet comprises sending at least some data packets encrypted via a bearer of said second set and sending a corresponding decryption key to at least one intended recipient via a bearer of said first set.

9. The method of claim 1, further comprising paging the mobile node only if no prior data packets have been sent to the mobile node via the at least one interface unit to the selected bearer network for a predetermined period of time.

10. The method of claim 1, further comprising adjusting a tariff so as to promote use of more lightly loaded bearer networks.

11. A network element for a multi-bearer network, wherein the multi-bearer network provides at least one interface unit to each of multiple alternative bearer networks between the multi-bearer network and the mobile node, the network element comprising:

a processor configured to provide:

a mobility management function for a mobile node; and a traffic management function for selecting an optimal bearer network for a data packet between the multi-bearer network and the mobile node, wherein the processor selects the optimal bearer network by evaluating, in combination, each of:

a quality-of-service requirement of the data packet in question;

traffic load data related to the multiple bearers;

dynamically maintained interface unit availability information; and bearer type preference information.

12. The network element of claim 11, wherein said processor is configured to combine said traffic load data, said interface unit availability information and said bearer type preference information into a data structure which functionally corresponds to a two-dimensional table which directly indicates a preferred interface unit for each combination of a subscriber and a quality-of-service requirement.

13. A mobile node suitable for interfacing with a multi-bearer network that provides at least one interface unit to each of multiple alternative bearer networks between the multi-bearer network and the mobile node, the mobile node comprising:

a processor; and a memory having preferred interface unit information for the mobile node stored therein, wherein the preferred interface unit information comprises, for each bearer type of the multiple alternative bearer networks, an indication of one or more preferred interface units and an associated preference ranking, wherein the processor is configured to transmit bearer preference information obtained from the stored preferred interface unit information to the multi-bearer network.

14. A mobile node according to claim 13, wherein the processor is configured to send the bearer preference information in connection with registration and location updates.

15. A method for selecting a bearer network for transmission of a data packet via a multi-bearer network (MBN), the data packet being addressed to a mobile node and indicating a quality-of-service requirement therein, the method comprising:

the MBN providing at least one interface unit to each of multiple alternative bearer networks between the multi-bearer network and the mobile node;

the MBN providing a mobility management function to maintain mobility data related to the mobile node;

selecting a bearer network for sending a data packet between the MBN and the mobile node based on a combined evaluation of each of:

the indicated quality-of-service requirement of the data packet;

traffic load data related to the multiple bearers;

dynamically maintained interface unit availability information; and bearer type preference information.

16. A method according to claim 15, further comprising sending the data packet to the mobile node via an interface unit to the selected bearer network.

17. A method according to claim 16, further comprising paging the mobile node before sending the data packet.

18. A method according to claim 17, further comprising paging the mobile node via a default bearer network for paging.

19. A method according to claim 18, further comprising registering the default bearer network for paging in the mobile node's subscription data.

20. A method according to claim 17, wherein the paging comprises ordering the mobile node to monitor the selected bearer network.

21. A method according to claim 20, wherein the paging comprises sending decryption data for decrypting one or more encrypted data packets.

22. A method for selecting a bearer network for a data packet via a multi-bearer network (MBN), the data packet being addressed to a mobile node and the data packet directly or indirectly indicating a quality-of-service requirement, the method comprising:

the MBN providing at least one interface unit to each of multiple alternative bearer networks between the multi-bearer network and the mobile node;

the MBN providing a mobility management function to maintain mobility data related to the mobile node;

selecting a bearer network for sending a data packet between the MBN and the mobile node based on:

the quality-of-service requirement of the data packet;

traffic load data related to the multiple bearers;

dynamically maintained interface unit availability information; and bearer type preference information;

sending the data packet to the mobile node via an interface unit to the selected bearer network;

paging the mobile node before sending the data packet; and paging the mobile node only if no prior data packets have been sent to the mobile node via the interface unit to the selected bearer network for a predetermined period of time.

23. A traffic management unit for a multi-bearer network (MBN) that provides multiple alternative bearer networks for transmitting data packets between a mobile node and a correspondent node, the traffic management unit comprising:

means for collecting traffic load information from the alternative bearer networks;

means for collecting traffic management-related information from the mobile node and an associated home multi-bearer network;

means for sending traffic management-related messages containing at least a portion of the traffic management-related information to the mobile node;

means for selecting a bearer network for downlink traffic based, at least in part, on both the traffic load information and on a quality-of-service requirement of the downlink traffic; and means for forwarding downlink traffic to the selected bearer network.

24. The traffic management unit of claim 23, further comprising an interface with a mobility management unit through which available interface information is provided.

25. The traffic management unit of claim 23, wherein the collected traffic load information is used to adjust a tariff so as to promote use of more lightly loaded bearer networks.

26. A traffic management unit for managing data packets in a multi-bearer network (MBN), the multi-bearer network providing multiple alternative bearer networks for transmitting data packets between a mobile node and a correspondent node, the traffic management unit comprising:

means for collecting traffic load information from the alternative bearer networks;

means for collecting bearer preference information from the mobile node, wherein the bearer preference information is determined, at least in part, by both the traffic load information and a quality-of-service requirement of the transmitted data packets;

means for creating and updating bearer routing information to a traffic distribution unit, and means for sending traffic administrative messages to the mobile node.

27. A traffic management unit according to claim 26, further comprising means for collecting bearer type preference information from the mobile node's home MBN.

28. A traffic management unit according to claim 26, further comprising means for changing tariffs for one or more of the multiple alternative bearer networks based on the traffic load information from the bearer networks.

29. The traffic management unit of claim 26, wherein the collected traffic load information is used to adjust a tariff so as to promote use of more lightly loaded bearer networks.

30. A memory for storing data for access by an application program being executed by a processor in a multi-bearer network (MBN) that provides multiple alternative bearer networks for transmitting a data packet to a mobile node, each data packet directly or indirectly indicating a traffic class of a plurality of traffic classes, wherein the memory comprises:

a data structure that accommodates information that directly indicates a bearer network applicable to the plurality of traffic classes, and wherein the data structure further accommodates information that interrelates the multiple alternative bearer networks with a quality-of-service requirement of each of the plurality of traffic classes, traffic load data related to the multiple alternative bearer networks, dynamically maintained interface unit availability information, and bearer type preference information.

31. The memory of claim 30, wherein the data structure directly indicates a bearer network for each combination of an active mobile node and a traffic class.

32. The memory of claim 30, wherein the data structure also indicates whether at least one data packet has been sent to the mobile node during a last predetermined period of time.

* * * * *